MAGNETIC RECORDING SURFACE

Filed April 19, 1954

INVENTOR.
JACOB J. HAGOPIAN
BY John B. Sponsler
AGENT 2,913,246

MAGNETIC RECORDING SURFACE

Jacob J. Hagopian, Santa Clara County, Calif., assignor to International Business Machines Corporation, New York, N.Y., a corporation of New York Application April 19, 1954, Serial No. 424,106

7 Claims. (Cl. 274—41.4)

This invention relates to magnetic recording; particularly, the invention is concerned with magnetic recording media related to magnetic surface coatings of discs.

In the magnetic recording art where discs are used as the recording media, usually discs made of a non-magnetic material are coated or plated on one or both sides with an even layer of a magnetizable material. The disc is normally rotated at a constant speed both for recording and for reproducing, and the data is recorded in circular paths or tracks on one or both surfaces of the disc. Where rotatable magnetic discs are provided in this manner, several recording problems are eminent, since the linear speed of recording is greater at the perimeter of such a disc than toward its center with respect to a transducer. A uniformly recorded signal on such a disc will provide a signal or output which is high on the perimeter track and which progressively decreases toward the center of the disc, due to the decreasing relative speed of the recording track toward the center of the disc. This is usually an objectionable feature which, for most uses, must be compensated for by one means or another. Consequently, an amplifier for accepting such a signal output must be carefully designed to have a wide input operating range; otherwise, erroneous reproduction may occur. Where magnetic discs of very large diameter are employed, it may not be practical to provide a suitable amplifier under some conditions.

The present invention provides a disc to compensate for the relative track speeds between the center and the perimeter tracks of a disc. This is obtained by providing a disc having a magnetic surface coating with a uniformly decreasing taper of thickness of magnetically responsive material toward the perimeter of the recording disc. The signal output derived from a magnetic recording medium may be increased by increasing the thickness of the recording surface. In the improved disc, therefore, a predetermined amount of recording energy will produce a record which will reproduce a signal of a more constant amplitude on playout throughout the entire recording area of the disc. This is possible because in such a disc the thickness of the recording area is effectively decreased in proportion to the increase of relative linear speed of the recording track. It has been established, for example, that a disc having an outside track of 30 inches and an inside track of 10 inches will provide an equal signal from both tracks when both tracks are subject to the same recording energy, if the outside track coating is 0.0002 inch thick and the inside track coating is 0.0006 inch thick. A disc so constructed will give a substantially constant signal output regardless of the track from which signals are reproduced.

Accordingly, an object of the invention is to provide an improved magnetic recording disc.

Another object is to provide a disc having a magnetic surface coating with a uniformly varying thickness.

A further object is to provide means for applying a magnetic coating to a disc of constant thickness to provide a magnetic disc of uniformly varying thickness between its center and its perimeter.

Still another object is to provide a means of applying a thin coating of magnetically responsive material to a flat surface.

Other objects of the invention will be pointed out in the following description and claims and illustrated in the accompanying drawings, which disclose, by way of example, the principle of the invention and the best mode which has been contemplated of applying that principle.

Figures 1, 2, 3:
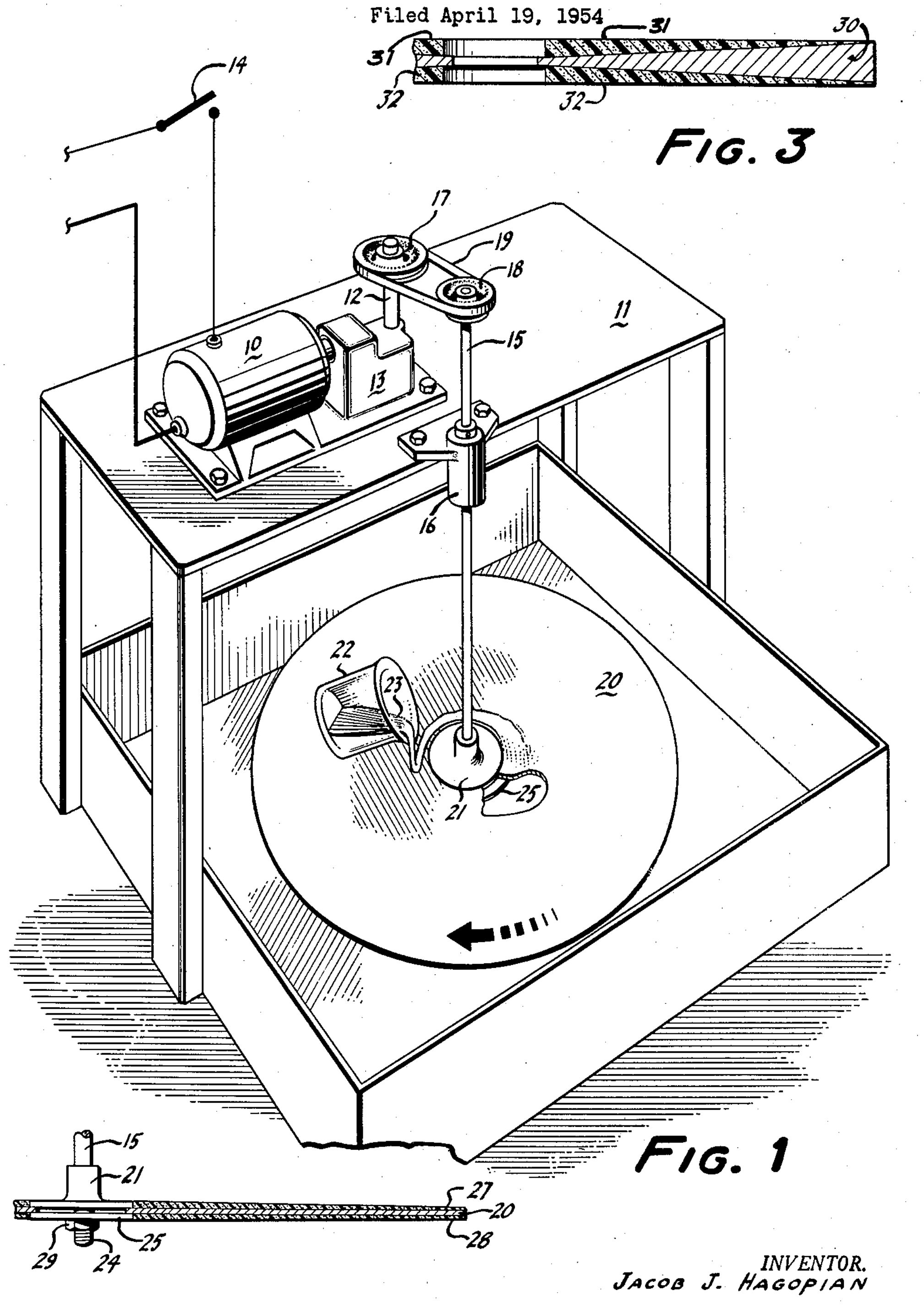
Fig. 1 is a perspective view of the invention.
Fig. 2 is a sectional view of the invention.
Fig. 3 is a sectional view of another embodiment of the invention.

An understanding of the invention is derived from Fig. 1 of the drawings, where a motor 10, mounted on a base 11, is arranged to rotate a shaft 12 at a reduced rate of revolution through the use of the reduction mechanism 13. A source of power is provided for the motor 10 controlled by a switch 14. The shaft 12 is positioned vertically and is rotatably supported by the mechanism 13. A second shaft 15 is similarly positioned vertically in a parallel relationship to shaft 12 and is rotatably supported by a bearing 16 mounted on the base 11. The shaft 12 is provided with a pulley 17, and the shaft 15 is provided with a pulley 18. The pulley 18 is driven by the pulley 17 via a belt 19. The bottom of the shaft 15 is fitted with a collar 21 and has threads 24 adapted to receive a nut 29 and a washer 25. A circular disc 20, cut to a desired diameter and with a hole provided in the center, is provided made of a suitable material for a supporting surface for a magnetic record. The surface of the disc 20 may be rendered smooth by sanding or buffing, and cleaned with a suitable solvent, if necessary. The disc 20 is affixed to the shaft 15 with the surface to be coated facing upwardly. The disc 20 is affixed to the shaft 15 by centering the hole therein around the shaft 15 and against the collar 21, and then forcing the washer 25 against the bottom surface of the disc 20 with the nut 29. A suitable liquid mixture 23, such as a magnetic powder evenly distributed in a lacquer, is provided in a container 22 which has a suitable pouring spout. A predetermined amount of the mixture is poured in a puddle around the top center of the disc 20 substantially as shown in Fig. 1. When the mixture 23 is poured on the disc 20, the motor 10 is energized by closing the switch 14, thereby causing the disc 20 to rotate. The centrifugal force thus created forces the mixture 23 from the center of the disc outwardly, thereby spreading the mixture 23 evenly on the surface of the disc 20. However, since the mixture 23 may include a fast drying lacquer, it is apparent that drying may take place earlier at the center of the disc 20 than at the perimeter. Consequently, the thickness of the coating will therefore be greater near the center. A tapering layer of magnetic material, such as is illustrated in Fig. 2, may be produced on each side of the disc 20 by coating each side in a similar manner so as to produce a flat disc 20 having tapered layers 27 and 28. Normally, the combined effect of the fast drying qualities of the lacquer, the increase of centrifugal force as the perimeter is approached, and the circulation of air over the disc as a result of the rotation are sufficient to produce tapered layers 27 or 28, as shown. The tapering effect, however, is intensified in one or more of the following ways—such as driving the disc at varying rates of speed during the coating process, using a lacquer of slower or faster drying qualities, using a mixture having a greater or lesser viscosity for a predetermined speed of disc rotation, roughening or smoothing the surface of the uncoated disc prior to coating (e.g., the surface near the center may be made rougher and more absorbing of the mixture than the surface near the perimeter). The tapered layers 27 and 28 can also be produced by other processes, such as by cutting or grinding a coated disc surface to a suitable taper.

In Fig. 3, a disc 30 is provided with a uniformly tapering contour which is thick at the perimeter and thin toward the center. A coating of a magnetic material, as discussed above in connection with Fig. 1, is placed on the top surface of the disc 30 by some convenient method so as to form a perfectly flat surface of magnetic material 31 thereon, which is increasingly thick toward the center of the disc, as shown. Similarly, an identical coating 32 is applied on the bottom side of the disc 30. This configuration has the advantage of allowing a transducer to travel a perfectly uniform distance relative to the disc when the transducer travels on a plane parallel with the horizontal axis of the disc.

It is to be understood that the degree of taper desirable bears a direct relation to the compensation desired. Consequently, the various factors enumerated above may be utilized, within limits, to bring about any reasonable degree of taper. Nevertheless, any degree of taper whatsoever so provided in the magnetic disc or recording medium will bring about some degree of equalization of the output signal between recording tracks.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A magnetic recording medium including a surface having a center portion and a perimeter portion, a magnetic coating for said surface, said coating being thicker on the said center portion than on the said perimeter portion to compensate for output signal differences caused by said portions having different linear speeds.

2. A magnetic recording disc including a magnetic coating for a surface of said disc, said coating being of a uniformly increasing thickness from the perimeter of said surface inwardly to compensate for the difference in signal response of radially spaced areas resulting from uniform rotation of said disc.

3. A magnetic record comprising a disc having a uniform thickness, a magnetic coating on each side of said disc, each said coating being relatively thick at the center portion of said disc and uniformly thinner toward the perimeter of said disc to cause the signal response of two radially spaced areas of said coating to be substantially uniform.

4. A magnetic recording medium comprising a nonmagnetic disc having a flat surface, a layer on said flat surface having high magnetic retentivity, the thickness of said layer tapering from the center of said flat surface to cause the reproducing characteristics of radially spaced areas to be substantially uniform when said disc is uniformly rotated.

5. A magnetic recording medium comprising a nonmagnetic disc of uniform thickness and a magnetizable layer on each side of said disc, the thickness of each said layer decreasing toward the perimeter of said disc to compensate for output signal differences of radially spaced areas caused by linear speed differences.

6. A magnetic recording disc having less thickness at its perimeter than at its center and uniformly varying thickness therebetween to compensate for variations in recording voltages caused by areas of equal magnetization having different linear speeds.

7. A magnetic recording disc having a coating of magnetizable material between its perimeter and its center, the thickness of said coating varying inversely as a function of the distance from said center to compensate for variations in reproducing characteristics from radially spaced areas caused by said areas having different linear speeds relative to the same transducer.

References Cited in the file of this patent

UNITED STATES PATENTS

| | | |
|---|---|---|
| 476,054 | Magenis | May 31, 1892 |
| 825,065 | Maitre | July 3, 1906 |
| 934,601 | Fuller | Sept. 21, 1909 |
| 936,490 | Stuart | Oct. 12, 1909 |
| 1,548,895 | Mertz | Aug. 11, 1925 |
| 2,594,893 | Faus | Apr. 29, 1952 |

OTHER REFERENCES

Magnetic Recording, by S. J. Begun, published by Murray Hill Books, Inc., 1949, pages 81–82.